United States Patent
Sprague (10) Patent No.: US 8,599,992 B2
(45) Date of Patent: Dec. 3, 2013

(54) METHOD AND APPARATUS FOR A JET PUMP INLET MIXER INTEGRAL SLIP JOINT CLAMP

(75) Inventor: Robin D. Sprague, Wilmington, NC (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 548 days.

(21) Appl. No.: 12/982,035

(22) Filed: Dec. 30, 2010

(65) Prior Publication Data

US 2012/0170703 A1 Jul. 5, 2012

(51) Int. Cl.
*G21C 15/00* (2006.01)
(52) U.S. Cl.
USPC .............................. 376/372; 376/204; 376/392
(58) Field of Classification Search
USPC ......................................... 376/204, 372, 392
See application file for complete search history.

(56) References Cited

U.S. PATENT DOCUMENTS

| | | | |
|---|---|---|---|
| 4,285,770 | A | 8/1981 | Chi et al. |
| 6,394,765 | B1 | 5/2002 | Erbes et al. |
| 6,438,192 | B1 | 8/2002 | Erbes et al. |
| 6,587,535 | B1 | 7/2003 | Erbes et al. |
| 2008/0029969 | A1 | 2/2008 | Torres |
| 2008/0031741 | A1 | 2/2008 | Torres |

FOREIGN PATENT DOCUMENTS

JP 2008170367 A * 7/2008

* cited by examiner

*Primary Examiner* — Timothy A Brainard
(74) *Attorney, Agent, or Firm* — Harness, Dickey & Pierce, PLC

(57) ABSTRACT

A method and apparatus for providing a Boiling Water Reactor (BWR) jet pump inlet-mixer integral slip joint clamp to constrain the inlet mixer and diffuser to mitigate inlet mixer flow induced vibration of a BWR jet pump assembly. The slip joint clamp includes horizontally projecting flanges with vertical sidewalls that protrude toward a lowest distal end of the inlet mixer. Fasteners penetrating the flanges provide a biasing load on the diffusers by being tightened to press against an upper crown on the diffuser. One or more flanges may be used. Laterally disposed gaps between the flanges may provide a clearance for guide ears of the diffuser to fit between the flanges.

21 Claims, 9 Drawing Sheets

METHOD AND APPARATUS FOR A JET PUMP INLET MIXER INTEGRAL SLIP JOINT CLAMP

BACKGROUND OF THE INVENTION

1. Field of the Invention

Example embodiments relate generally to nuclear reactors, and more particularly to a method and apparatus for a Boiling Water Reactor (BWR) jet pump inlet-mixer integral slip joint clamp used to constrain the inlet mixer and diffuser to mitigate inlet mixer flow induced vibrations of a BWR jet pump assembly.

2. Related Art

A reactor pressure vessel (RPV) of a boiling water reactor (BWR) typically has a generally cylindrical shape and is closed at both ends (for example by a bottom head and a removable top head). A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and may be supported by conventional jet pump restrainer brackets. While conventional jet pump restrainer brackets may provide system stiffness that mitigates vibration of system components, inlet mixer slip joint flow induced vibration (SJFIV) may still occur between the inlet mixers and the diffusers. Inlet mixer SJFIV causes high vibratory loads during jet pump assembly operation which may be a major cause of jet pump wear issues.

Conventionally, many attempts have been made to reduce inlet mixer FIV. For instance, auxiliary wedges at the set screws of restrainer brackets, labyrinth seals, restrainer bracket pad repair, and replacement main wedges have all been used. While these conventional solutions have provided some additional system stiffness, none of the solutions mitigate the vibration occurring at the actual interface between the inlet mixer and the diffuser.

SUMMARY OF INVENTION

Example embodiments provide a method and an apparatus for a jet pump inlet mixer slip joint clamp. Example embodiments clamp an end of the inlet mixer to the diffuser to mitigate vibration at the actual interface between a bottom portion of the inlet mixer and an upper crown of the diffuser. The clamp may include a varying number of flanges. The flange or flanges may either be monolithically formed as integral or integrated components located near the distal end of a replacement inlet mixer (i.e., the replacement inlet mixer may replace an existing inlet mixer), or alternatively the flange or flanges may be retrofitted on the end of an existing inlet mixer. Jacking bolts or wedges may be used to produce the actual clamping force that may be applied to the bottom portion of the inlet mixer.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative fauns, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
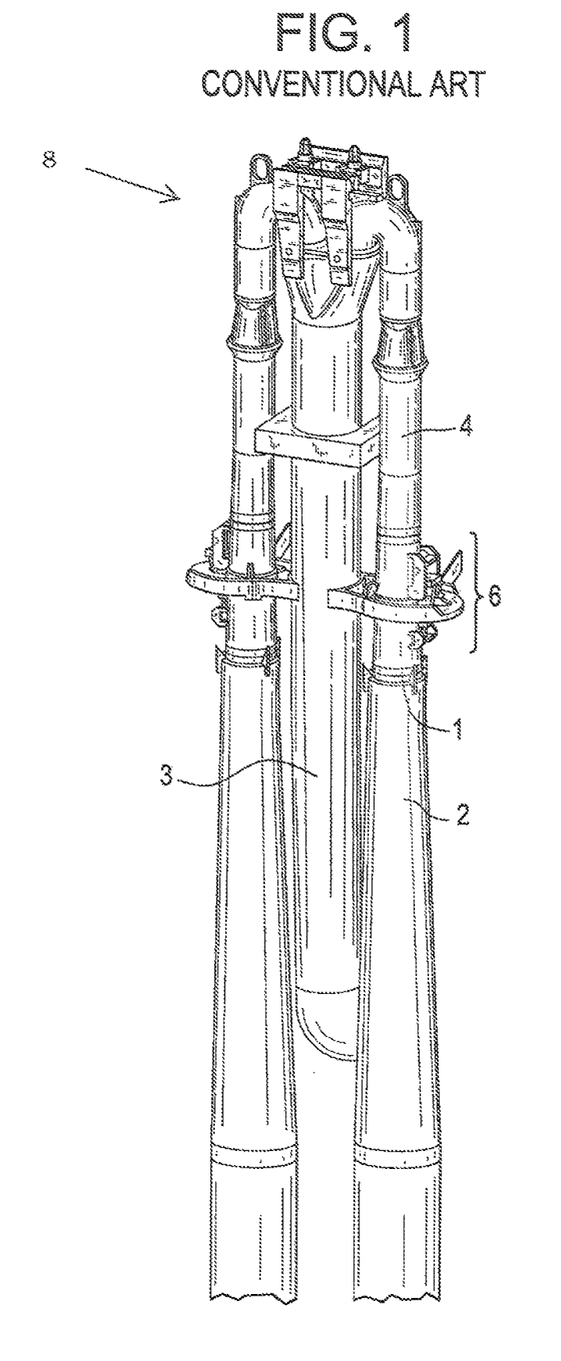
FIG. 1 is a perspective view of a conventional boiling water nuclear reactor (BWR) jet pump assembly.

FIG. 1 is a perspective view of a conventional nuclear boiling water reactor (BWR) jet pump assembly 8. The major components of the jet pump assembly 8 include a riser pipe 3, two inlet mixers 4 that insert into respective diffusers 2. Conventionally, jet pump restrainer brackets 6 are used to stabilize movement of the inlet mixers 4 and reduce movement (i.e., inlet mixer Flow Induced Vibration, or FIV) and leakage of the slip joint 1 that exists at the interface between the inlet mixers 4 and the diffusers 2.

Figure 2:
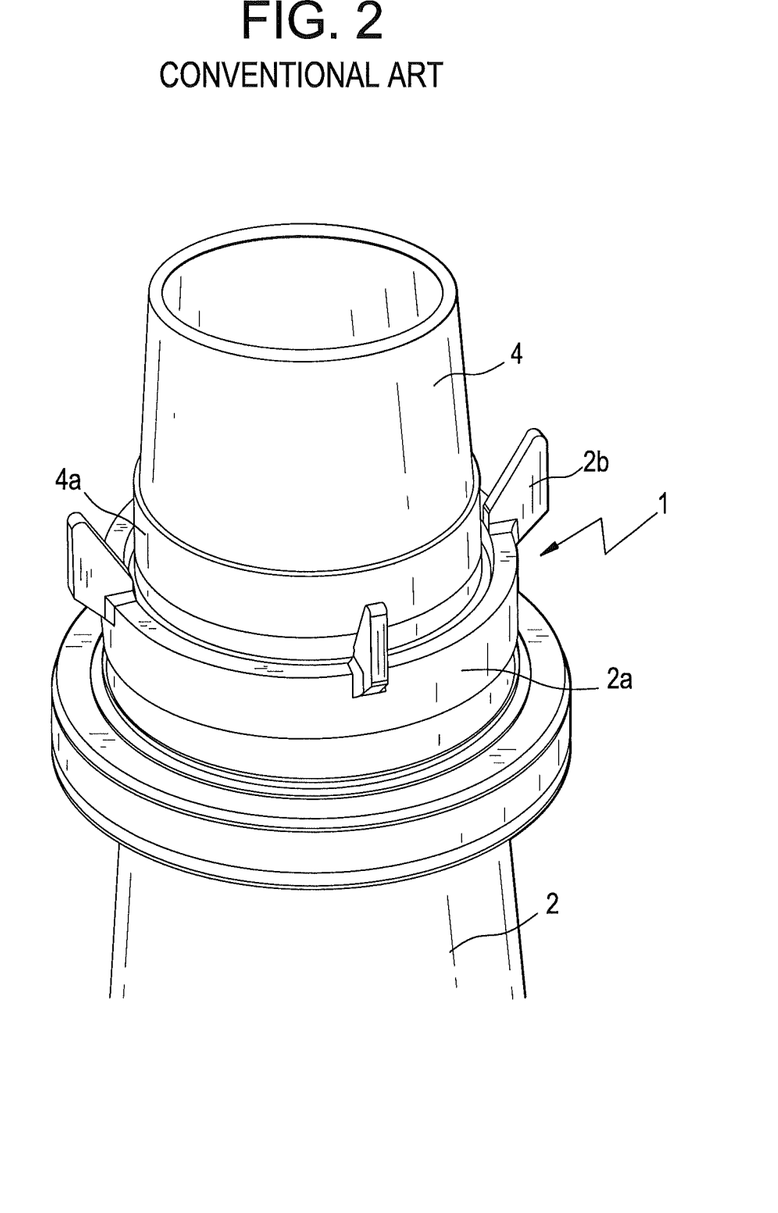
FIG. 2 is a detailed view of a conventional slip joint that exists between an inlet mixer and a diffuser of a BWR jet pump assembly.

FIG. 2 is a detailed view of a conventional slip joint that exists between an inlet mixer 4 and a diffuser 2 of a BWR jet pump assembly. It should be noted that the bottom portion 4a of the inlet mixer 4 inserts into the upper crown 2a of the diffuser 2 (which also includes guide ears 2b). The interface between the inlet mixer 4 and the diffuser 2 is referred to as a "slip joint" 1.

Figure 3:
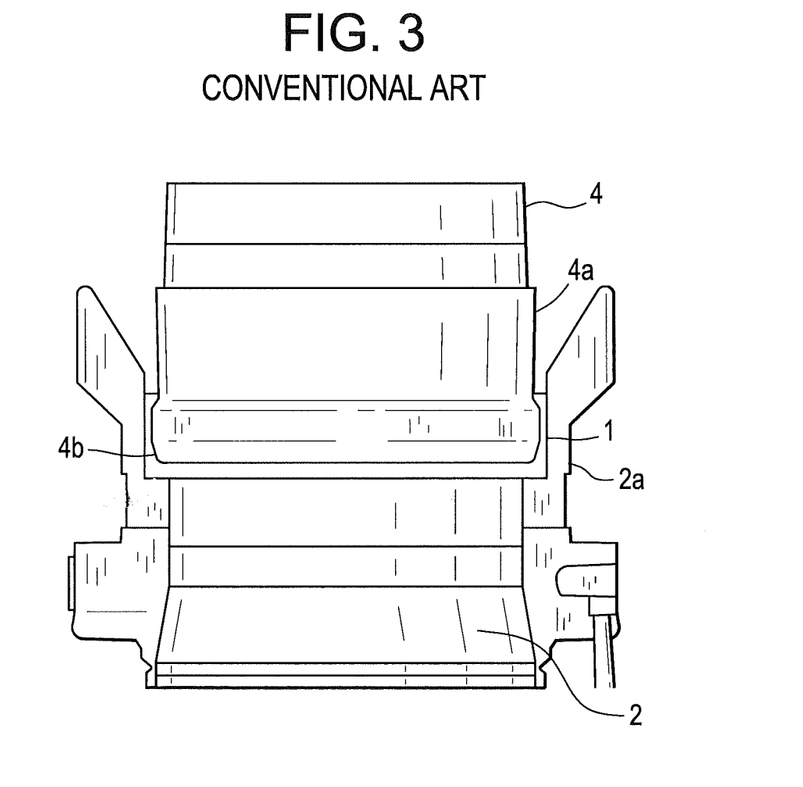
FIG. 3 is a cross-sectional view of a conventional slip joint that exists between an inlet mixer and a diffuser of a BWR jet pump assembly.

FIG. 3 is a cross-sectional view of a conventional slip joint 1 that exists between an inlet mixer 4 and a diffuser 2 of a BWR jet pump assembly. The lowest distal end 4b of inlet mixer 4 rests in the upper crown 2a of diffuser 2, to form slip joint 1. Conventionally, inlet mixer FIV may occur in the slip joint 1 when tolerances between the distal end 4b of the inlet mixer 4 and the upper crown 2a of diffuser 2 do not exactly match.

Figure 4:
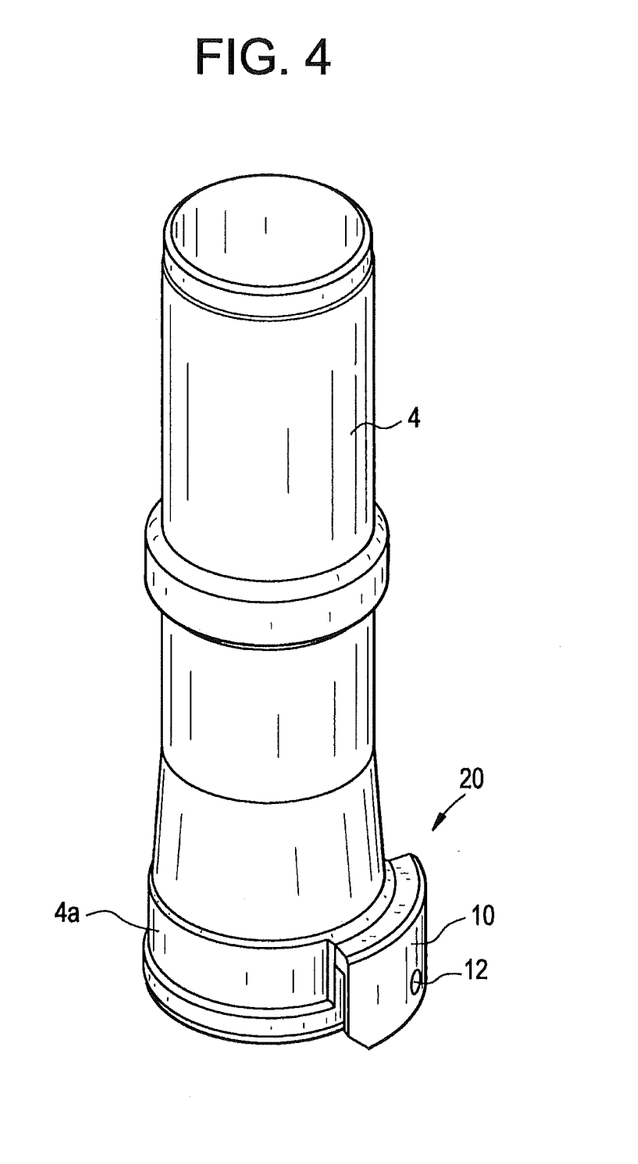
FIG. 4 is a detailed view of an inlet mixer integral slip joint clamp, in accordance with an example embodiment.

FIG. 4 is a detailed view of an inlet mixer integral slip joint clamp 20, in accordance with an example embodiment. The clamp 20 may include a flange 10 in the shape of an arc that may be monolithically formed on a bottom portion 4a of a replacement inlet mixer 4. The flange 10 may include one or more jacking bolt holes 12 in the flange 10. While only one flange 10 is shown in the drawing, more than one flange 10 may be provided.

Alternative to providing a monolithically formed flange 10, a boss (not shown) may instead be formed on or near the bottom portion 4a of the inlet mixer 4. The boss may then act as a base to then attach a flange 10 to the boss. The boss may be monolithically formed on the inlet mixer. The boss may include one or more female dovetail slots that may accept male dovetail protrusions that can be used to stabilize the flange on the boss. Other structures for securely fastening a flange to the boss may also be used, such as bolts or welding.

Alternative to providing a monolithically formed boss (to act as a base for a flange) near the bottom portion 4a of the inlet mixer 4, a flange may instead be directly retrofitted onto the bottom portion 4a of the inlet mixer 4 by other structures. For instance, the flange may be bolted or welded directly onto the inlet mixer.

Figure 5:
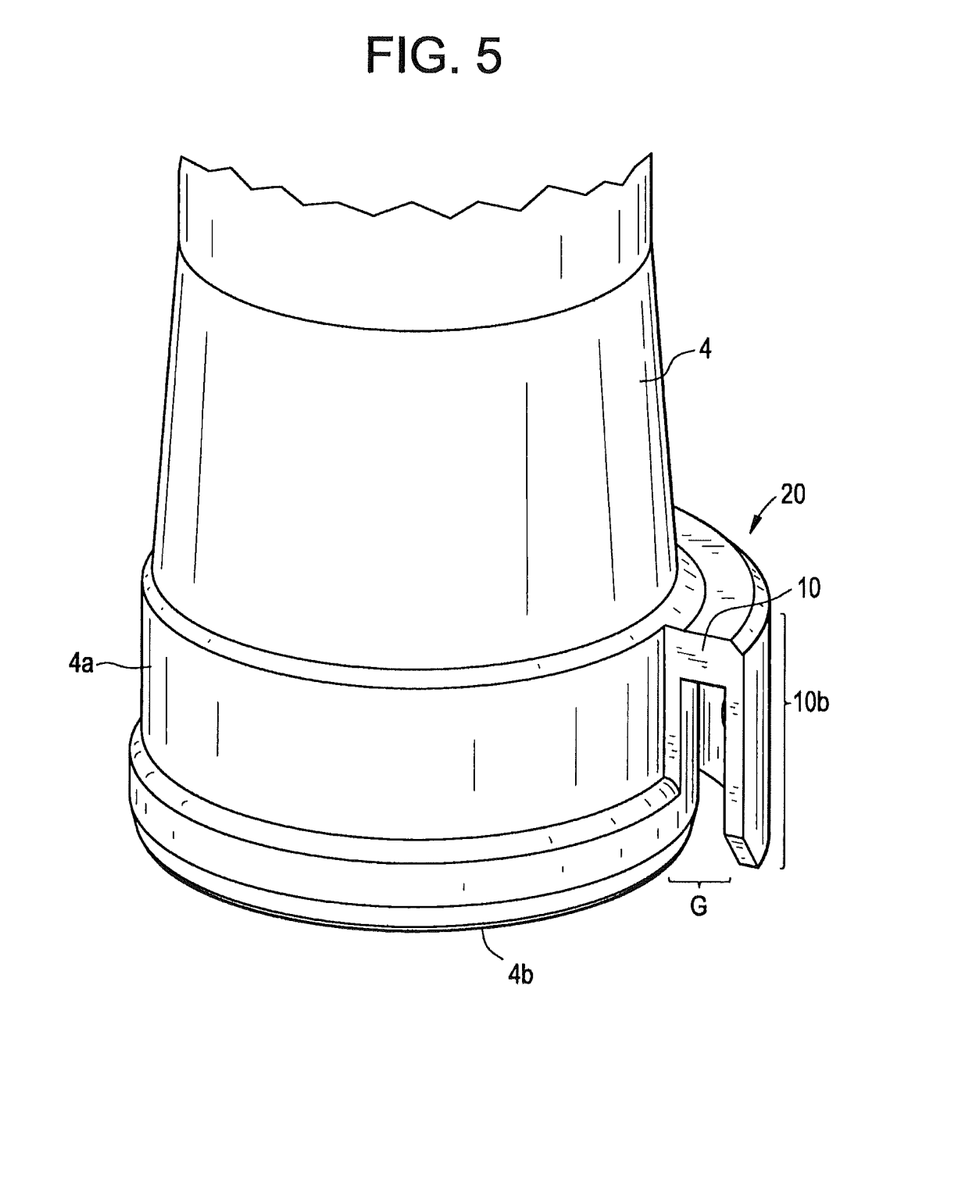
FIG. 5 is a close-up detailed view of an inlet mixer integral slip joint clamp, in accordance with an example embodiment.

FIG. 5 is a close-up detailed view of an inlet mixer integral slip joint clamp 20, in accordance with an example embodiment. Flange 10 may horizontally protrude from the bottom portion 4a of the inlet mixer. Flange 10 may also have a vertical sidewall 10b that is substantially parallel with sidewalls of the bottom portion 4a of the inlet mixer. The vertical sidewalls 10b vertically project toward a lowest distal end 4b of the inlet mixer 4. The length of sidewall 10b may be sized to cause the distal end 10a of flange 10 to protrude to an elevation that is about equal to the lowest distal end 4b of the inlet mixer 4 (i.e., the distal end 10a of flange 10 may be located at about the same elevation as that of the lowest distal end 4b of the inlet mixer).

Notice that a gap G may be provided between the vertical sidewall 10b of flange 10 and the distal end the bottom portion 4a and lowest distal end 4b of the inlet mixer 4. The gap G may be sized to ensure a snug fit of a lip of an upper crown 2a of the diffuser between the bottom portion 4a of the inlet mixer 4 and a portion of an inner surface of the vertical sidewall 10b of the flange, as shown in FIGS. 7-8.

Figure 6:
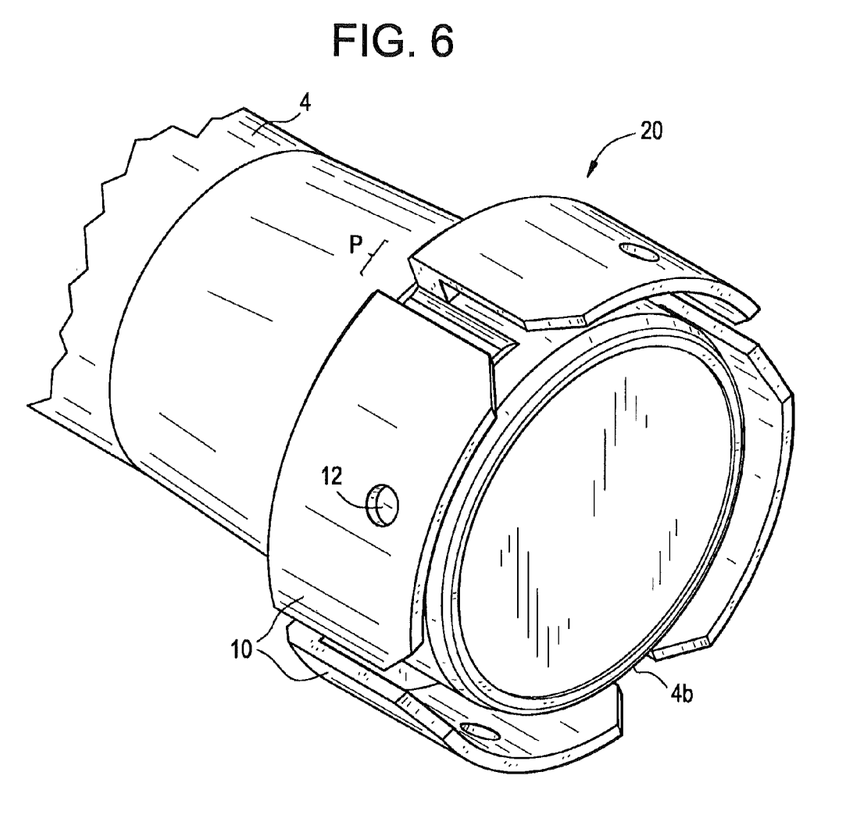
FIG. 6 is a close-up detailed view of an inlet mixer integral slip joint clamp, in accordance with an example embodiment.

FIG. 6 is a close-up detailed view of an inlet mixer integral slip joint clamp 20, in accordance with an example embodiment. This example embodiment includes four flanges 10, rather than just one flange. Each flange may include one or more jacking bolt holes 12. A laterally disposed gap P may be included between the flanges to provide a clearance for guide ears 2b of the diffuser when the clamp 20 is installed.

Figure 7:
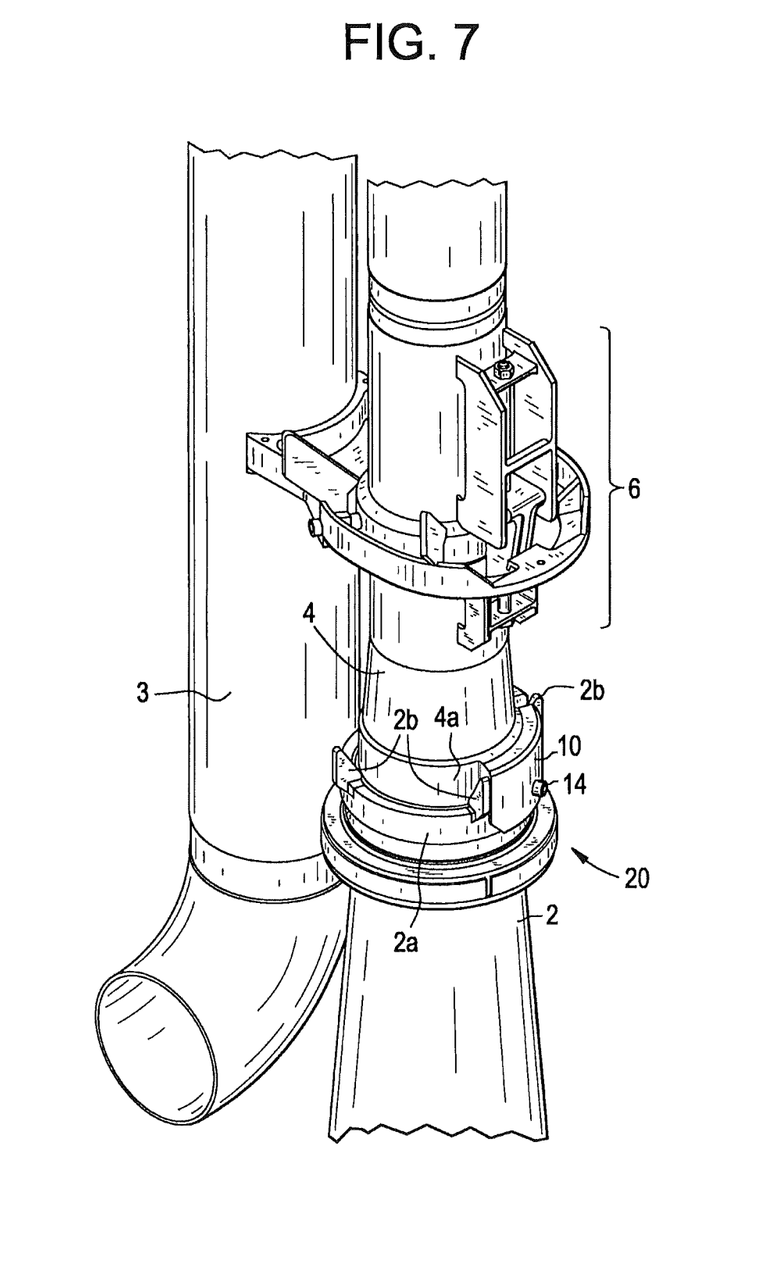
FIG. 7 is a perspective view of an inlet mixer integral slip joint clamp installed on a BWR jet pump assembly, in accordance with an example embodiment.
Figure 8:
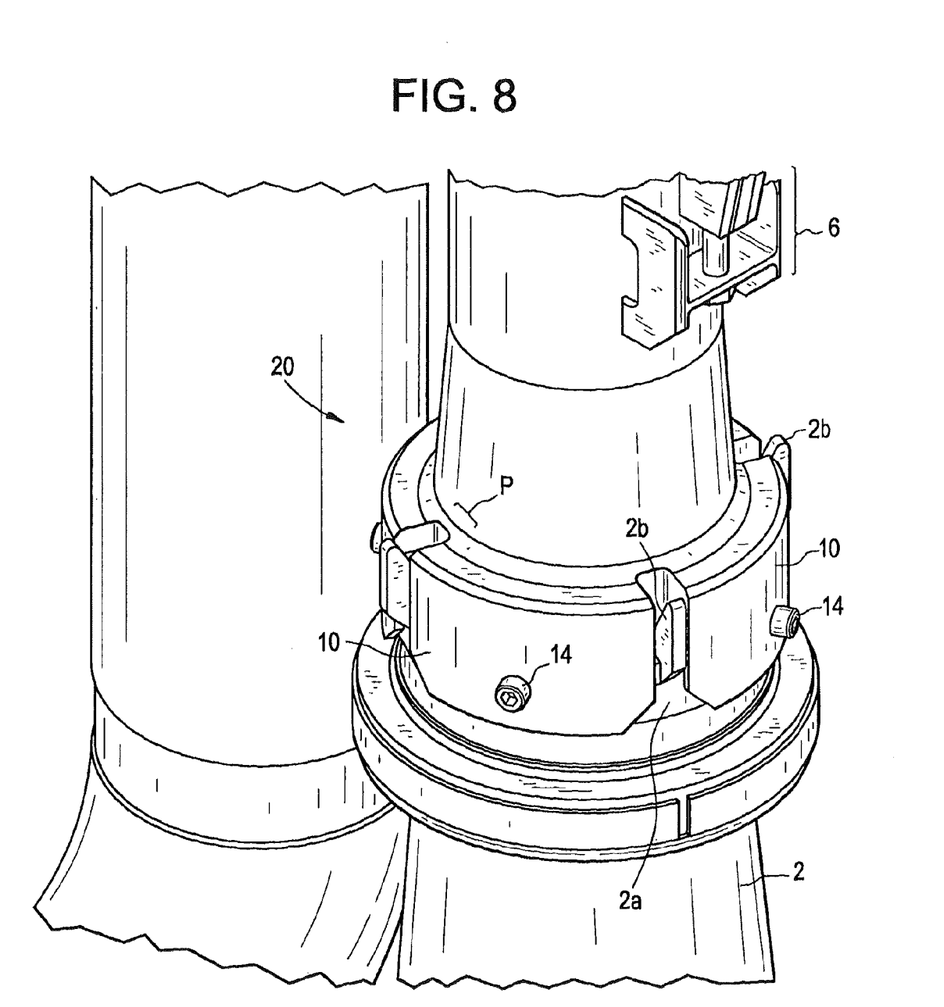
FIG. 8 is a close-up detailed view of an inlet mixer integral slip joint clamp installed on a BWR jet pump assembly, in accordance with an example embodiment.

FIG. 7 is a perspective view of an inlet mixer integral slip joint clamp 20 installed on a BWR jet pump assembly 8, in accordance with an example embodiment. Flange 10 may overhang the upper crown 2a of the diffuser. To further stabilize flange 10, the flange 10 may be sized to fit snuggly between guide ears 2b of the diffuser 2. Jacking bolt 14 may penetrate jacking bolt hole 12 and bear against the upper crown 2a of the diffuser. Anti-rotational structures for ensuring that the jacking bolts 14 do not back out of the jacking bolt holes 12 may also be used. Anti-rotational structures may include ratchet teeth (on the jacking bolt) and keepers (engaging the ratchet teeth, and ensuing that the jacking bolt does not rotate).

Alternative to jacking bolt holes 12 and jacking bolts 14, a double acting wedge with a cap screw may be attached to an inner surface of each flange 10, and the cap screw may be used to bias the wedge against the upper crown 2a of the diffuser. Anti-rotational structures, such as ratchet teeth and a keeper, may also be used with the double acting wedge and cap screw.

Alternative to jacking bolts or wedges/cap screws, a press fit (with a tight tolerance, relying solely on friction to hold the components together) may be relied upon to provide a secure fit between the bottom portion 4a of the inlet mixer, the flange 10 and the upper crown 2a of the diffuser. Additionally, a spring element may be used in lieu of jacking bolts, wedges/cap screws, or press fitting to provide a biasing load on the diffuser.

It should be understood that, when using only one flange 10, or when using flanges on only one side of the inlet mixer 2, the force produced by the flange 10 and jacking bolt 14 may cause the inlet mixer 2 to be off-center from the diffuser 2a itself. The off-centering of the diffuser 2 is acceptable, and is not disadvantageous to the overall performance of the BWR jet pump assembly 8.

FIG. 8 is a close-up detailed view of an inlet mixer integral slip joint clamp 20 installed on a BWR jet pump assembly 8, in accordance with an example embodiment. In this embodiment, multiple flanges 10 (specifically, four flanges) are provided. Gap P may provide a clearance for guide ears 2b. It should be understood that one or more flanges 10 may be provided between each guide ear 2b, rather than using the configuration shown in FIG. 8. Alternatively, more or less flanges 10 may be provided, alternative to FIG. 8.

Figure 9:
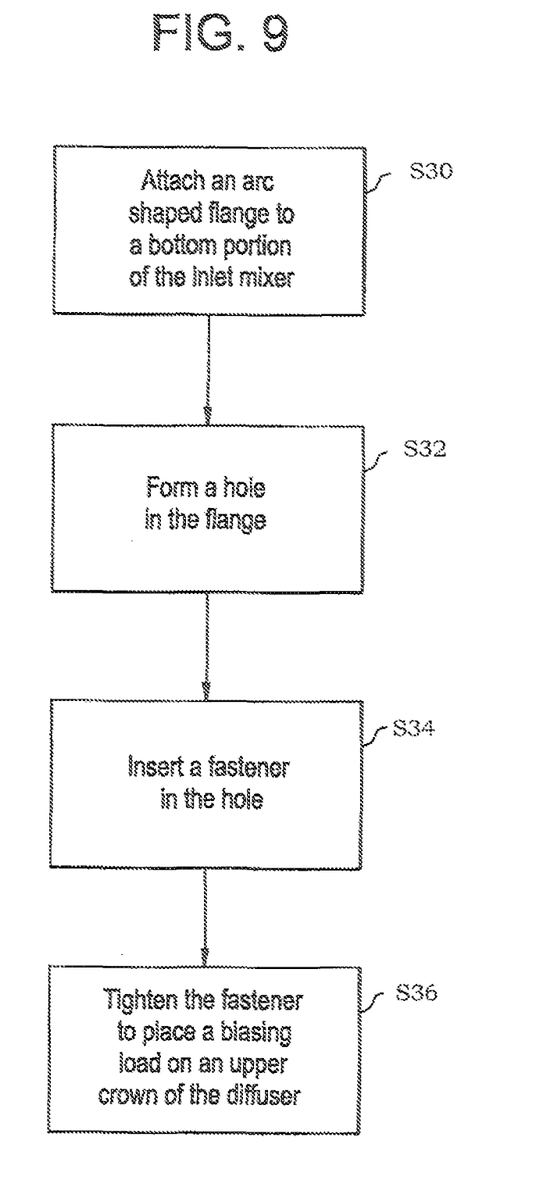
FIG. 9 is a flowchart of a method of installing a jet pump inlet mixer slip joint clamp on a BWR jet pump assembly, in accordance with an example embodiment.

FIG. 9 is a flowchart of a method of installing a jet pump inlet mixer slip joint clamp 20 on a BWR jet pump assembly 8, in accordance with an example embodiment. In step S30, an arc shaped flange 10 may be attached to a bottom portion 4a of an inlet mixer 4. In step S32, a hole 12 may be formed in the flange 10. In step S34, a fastener may be inserted into the hole 12. In step S36, the fastener may be tightened to place a biasing load on the upper crown 2a of the diffuser.

Materials of construction for flanges may be the material as the jet pump inlet mixer. Specifically, the flanges may be made of cast or wrought type 304 stainless steel, or equivalent material. All other component parts may be austenitic stainless steel, XM-19, X-750, or equivalent material.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A boiling water reactor (BWR) jet pump assembly inlet mixer slip joint clamp, comprising:
at least one flange configured to attach to a bottom portion of an inlet mixer of a BWR jet pump assembly,
the at least one flange having an arc shape and configured to horizontally protrude from the inlet mixer when the flange is installed on the inlet mixer of the jet pump assembly,
the at least one flange having a vertical sidewall that is configured to protrude toward a lowest distal end of the inlet mixer when the flange is installed on the inlet mixer of the jet pump assembly.

2. The clamp of claim 1, further comprising:
at least one jacking bolt hole in each flange.

3. The clamp of claim 2, further comprising:
a jacking bolt penetrating each jacking bolt hole, the jacking bolt configured to bear against an upper crown of a diffuser when the flange is installed on the inlet mixer.

4. The clamp of claim 2, further comprising:
ratchet teeth on each jacking bolt; and
a keeper, engaging the ratchet teeth, to prevent jacking bolt rotation.

5. The clamp of claim 1, wherein the vertical sidewall of the at least one flange is configured to be about parallel with a sidewall of the inlet mixer when the flange is installed on the inlet mixer of the jet pump assembly.

6. The clamp of claim 1, further comprising:
the inlet mixer, wherein the at least one flange is monolithically formed on the bottom portion of the inlet mixer.

7. The clamp of claim 6, wherein a distal end of the at least one flange is located at an elevation that is about equal to an elevation of the lowest distal end of the inlet mixer.

8. The clamp of claim 6, wherein the at least one flange defines a gap between the vertical sidewall of the flange and a sidewall of the inlet mixer.

9. The clamp of claim 8, wherein the gap is sized to allow a lip of an upper crown of a diffuser to fit between the sidewall of the flange and the sidewall of the inlet mixer.

10. The clamp of claim 6, wherein the at least one flange includes at least two flanges.

11. The clamp of claim 10, wherein the at least two flanges define laterally disposed gaps, between each flange.

12. The clamp of claim 11, wherein the laterally disposed gaps are sized to allow a guide ear of a diffuser to fit between the flanges and inside the laterally disposed gaps.

13. The clamp of claim 1, further comprising:
a double acting wedge and cap screw attached to an inner surface of each flange, the cap screw configured to bias the wedge against an upper crown of a diffuser of the jet pump assembly when the flange is installed on the inlet mixer.

14. A system including a boiling water reactor (BWR) jet pump assembly inlet mixer slip joint clamp installed on a BWR jet pump assembly, comprising:
a diffuser with an upper crown;
an inlet mixer with a lowest distal end and a bottom portion, the lowest distal end inserted into the upper crown of the diffuser; and
at least one flange having an arc shape and being attached to the bottom portion of the inlet mixer, the at least one flange horizontally protruding from the inlet mixer and including,
a vertical sidewall protruding toward the lowest distal end of the inlet mixer, a portion of an inner surface of the vertical sidewall contacting the upper crown of the diffuser,
at least one jacking bolt penetrating each flange, the jacking bolt configured to bear against the upper crown of the diffuser.

15. The system of claim 14, wherein
the at least one flange includes at least two flanges,
the at least two flanges define laterally disposed gaps, between the flanges,
the gaps are sized to allow a guide ear of the diffuser to fit between the flanges and inside the gaps.

16. A method of installing a boiling water reactor (BWR) jet pump assembly inlet mixer slip joint clamp on a BWR jet pump assembly, comprising:
attaching at least one flange with an arc shape to a bottom portion of an inlet mixer, the at least one flange protruding vertically toward a lowest distal end of the inlet mixer;
forming at least one hole in each flange;
inserting a fastener in each hole; and
placing a biasing load on an upper crown of a diffuser by tightening each fastener and causing the fastener to bear against the upper crown.

17. The method of claim 16, wherein the attaching of the at least one flange on the inlet mixer includes attaching at least two flanges on the inlet mixer.

18. The method of claim 17, further comprising:
leaving laterally disposed gaps between each flange; and
inserting guide ears of the diffuser in the gaps.

19. The method of claim 16, wherein
the attaching of the at least one flange includes attaching the flange such that a distal end of the flange is at an elevation that is about equal with the lowest distal end of the inlet mixer.

20. The method of claim 16, further comprising:
preventing rotation of the fastener using anti-rotational structures, the anti-rotational structures including ratchet teeth and a keeper.

21. A method of installing a boiling water reactor (BWR) jet pump assembly inlet mixer slip joint clamp on a BWR jet pump assembly, comprising:
attaching at least one flange with an arc shape to a bottom portion of an inlet mixer, the at least one flange protruding vertically toward a lowest distal end of the inlet mixer;
attaching a double acting wedge and cap screw to an inner surface of each flange; and placing a biasing load on an upper crown of a diffuser by tightening the cap screw and causing the wedge to bear against the upper crown.

* * * * *